United States Patent
Adragna et al.

(10) Patent No.: US 8,416,597 B2
(45) Date of Patent: Apr. 9, 2013

(54) CONTROL DEVICE FOR RECTIFIERS OF SWITCHING CONVERTERS

(75) Inventors: Claudio Adragna, Monza (IT); Santo Ilardo, Catania (IT)

(73) Assignee: STMicroelectronics S.r.l., Agrate Brianza (IT)

(*) Notice: Subject to any disclaimer, the term of this patent is extended or adjusted under 35 U.S.C. 154(b) by 803 days.

(21) Appl. No.: 12/606,776

(22) Filed: Oct. 27, 2009

(65) Prior Publication Data

US 2010/0103704 A1    Apr. 29, 2010

(30) Foreign Application Priority Data

Oct. 27, 2008  (IT) .................. MI2008A1891

(51) Int. Cl.
*H02M 7/217*    (2006.01)

(52) U.S. Cl. .................. 363/127; 363/21.02

(58) Field of Classification Search .......... 363/21.02, 363/21.03, 21.05, 21.06, 21.14, 127
See application file for complete search history.

(56) References Cited

U.S. PATENT DOCUMENTS

| | | |
|---|---|---|
| 6,191,964 B1 | 2/2001 | Boylan et al. |
| 7,109,688 B1 | 9/2006 | Chiu et al. |
| 7,184,280 B2 | 2/2007 | Sun et al. |
| 7,193,866 B1 | 3/2007 | Huang |
| 2003/0021128 A1 | 1/2003 | Brkovic |
| 2003/0067794 A1 | 4/2003 | Boylan et al. |
| 2003/0081433 A1 | 5/2003 | Itakura et al. |
| 2004/0109335 A1 | 6/2004 | Gan et al. |
| 2004/0169498 A1 | 9/2004 | Goder et al. |
| 2009/0091951 A1* | 4/2009 | Yang et al. ............ 363/21.06 |
| 2009/0316441 A1* | 12/2009 | Hu .................. 363/21.06 |

* cited by examiner

*Primary Examiner* — Harry Behm
*Assistant Examiner* — Matthew Grubb
(74) *Attorney, Agent, or Firm* — Seed IP Law Group PLLC

(57) ABSTRACT

A control device for a rectifier of a switching converter, the converter powered by an input voltage and suitable for providing an output current. The rectifier is suitable for rectifying an output current of the converter and includes at least one transistor. The control device is suitable for driving the at least one transistor. The control device has a first circuit suitable for identifying the start and the end of every converter switching half-cycle and measuring the duration thereof, a second circuit suitable for generating a signal for turning on the transistor after a given number of measured converter switching half-cycles and when the output current of the converter becomes greater than a reference current.

31 Claims, 8 Drawing Sheets

CONTROL DEVICE FOR RECTIFIERS OF SWITCHING CONVERTERS

BACKGROUND

1. Technical Field

The present disclosure relates to a control device for rectifiers of switching converters and, in particular, of resonant converters.

2. Description of the Related Art

Resonant converters are a vast class of forced switching converters characterized by the presence of a resonant circuit that actively participates in determining the input-output power flow. In such converters a circuit consisting of a power switching bridge or half-bridge (typically of power MOSFETs), powered by DC voltage, generates a square wave voltage that is applied to a resonant circuit tuned to the fundamental frequency of the square wave. In this manner, because of its selective characteristics, the resonant circuit responds principally to this fundamental component and to a negligible degree to higher-order harmonics.

It follows that the circulating power can be modulated by varying the frequency of the square wave while maintaining the duty cycle constant at 50%, and that, according to the configuration of the resonant circuit, the currents or voltages associated with the power flow will have a pattern that is sinusoidal or piecewise sinusoidal. These voltages and currents are rectified and filtered so as to supply DC power to the load.

In offline applications, for reasons tied to safety regulations, the rectifier-filter system that supplies power to the load is coupled to the resonant circuit by means of a transformer that provides the isolation between source and load required under the aforesaid regulations. As in all isolated network converters, in this case as well it is customary to distinguish between a primary side (i.e., relating to the primary winding of the transformer) connected to the input source and a secondary side (i.e., relating to the secondary winding—or secondary windings—of the transformer) which supplies power to the load via the rectifier-filter system.

At present, one of the resonant converters most widely used is the LLC resonant converter, especially the half-bridge version. This name derives from the fact that the resonant circuit employs two inductors and one capacitor. The principle schematic of the half-bridge version is shown in FIG. 1, where a half-bridge of two transistors M1, M2 powered by an input voltage Vin and driven by a device 1, powers a series comprising a capacitor C, an inductance Ls and an inductance Lp, with a transformer 10 connected in parallel with the inductance Lp.

The transformer has a secondary winding with a center tap connected to ground GND, whereas the ends of the secondary winding are connected to rectifier diodes D1 and D2 having the cathodes connected together and to a parallel of a capacitor C1 and a resistance R, across which the output voltage Vout is present.

This converter, in addition to the typical advantages of resonant converters (waveforms without steep fronts, low switching losses of the power switches due to "soft" switching), has substantial advantages over converters that employ resonant circuits with only two reactive elements. In fact, the LLC converter is capable of working in a vast range of operating conditions with respect to input voltage and output current, including no load conditions, with a relatively small frequency variation; it has the possibility of achieving "soft" switching operations with all power switches in all operating conditions with respect to input voltage and output current. In fact, the power MOSFETs on the primary side have zero voltage turn-on (ZVS—Zero Voltage Switching), hence zero associated losses; whereas the rectifiers on the secondary side have zero current turn-on and turn-off (ZCS, Zero Current Switching) and hence with no reverse recovery and the phenomena associated therewith. The turn-off switching losses of the primary side power MOSFETs are also rather low. Additionally, a further advantage is magnetic integration, i.e., the possibility of combining all of the magnetic devices (inductances and transformer) in a single physical component.

As a consequence of such properties, these resonant converters are characterized by a high conversion efficiency (>95% is easily achievable), an ability to work at high frequencies, low generation of EMI (Electro-Magnetic Interference) and, finally, a high power density (which means the possibility of constructing conversion systems of reduced volume).

In current types of converter circuits, a high conversion efficiency and high power density are required, as in the case, for example, of the AC-DC adaptors of notebooks. LLC resonant converters are at present the converters that best meet such requirements.

However, the maximum efficiency achievable is limited by the losses in the rectifiers on the secondary side of the converter, which account for over 60% of total losses.

It is known that in order to significantly reduce the losses connected to secondary rectification, recourse can be made to the so-called "synchronous rectification" technique, in which rectifier diodes are replaced by power MOSFETs, with a suitably low on-resistance, such that the voltage drop across it is significantly lower than that across the diode; and they are driven in such a manner as to be functionally equivalent to the diode. This technique is widely adopted in traditional converters, especially in flyback and forward converters, for which there also exist commercially available dedicated integrated control circuits. There is an increasingly pressing need to adopt this technique in resonant converters as well, in particular in LLC converters, in order to enhance their efficiency as much as possible.

FIG. 2 shows the converter of FIG. 1 in the version with secondary synchronous rectifiers; in this case, in the place of diodes D1 and D2 there are two transistors T1 and T2, suitably driven by two signals G1 and G2 and connected between the terminals of the two parts of the center-tapped secondary winding connected to ground GND, while the parallel of C1 and R is disposed between the center tap of the secondary winding and ground GND. From a functional viewpoint there is no difference, as compared to the schematic in FIG. 1.

To drive the power MOSFETs T1 and T2 as synchronous rectifiers in a resonant converter use is sometimes made of methods borrowed from traditional PWM controlled converters, based, that is, on the "self-driven" approach, in which the drive voltage of the synchronous rectifiers is obtained through the auxiliary windings of the transformer, and the "primary-driven" approach, in which the same signal which drives the primary side power MOSFET gates is used to drive the gates of the synchronous rectifiers on the secondary side. Both methods present major drawbacks. In the case of the self-driven approach, the drive voltage does not have steep fronts which determine fast switching (necessary especially at turn-off) so that, due to the delays, current reversals can be observed in the synchronous rectifiers. These reversals, by acting as a dummy load, discharge the output capacitors, thereby increasing the output voltage ripple and impairing efficiency at medium-low loads, a parameter that is of hardly negligible importance given the most recent legislation regarding the reduction of consumption. In addition, the current regime in the transformer and in the resonant circuit is altered and in certain conditions a loss of ZVS can be observed, with consequences that may range from a moderate increase in power dissipation in the primary-side power MOSFETs to the destruction thereof due to triggering of the parasitic bipolar transistor intrinsic to the structure of the power MOSFETs.

In the case of the "primary-driven" approach, the converter functions correctly as long as the conduction of current in each synchronous rectifier occupies the entire switching half-period (CCM, Continuous Conduction Mode). Otherwise, that is, if the conduction of current to the secondary winding occupies only a fraction of the switching half-period (DCM, Discontinuous Conduction Mode), the converter will no longer work correctly. In fact, if the same signal is used for the primary-side MOSFETs and the synchronous rectifiers, the latter will remain turned on even if the current falls to zero before completion of the half-cycle, resulting in a reversal of current along with the aforesaid drawbacks. This constitutes a severe limitation to the operating capabilities of the converter. In order to avoid working in DCM, not only is there the constraint of working within a narrow operating range, but it is also necessary for the load never to fall below a certain minimum value because, like all converters, also the LLC resonant converter tends to work in DCM, in the sense described just above, under a low load.

Recently, more refined techniques have been developed with the aim of improving the drive logic of secondary synchronous rectifiers in this particular topology. Examples of these techniques are described in U.S. Pat. No. 7,184,280 and U.S. Pat. No. 7,193,866. In both cases the driving signals for the primary side power MOSFETs and for the synchronous rectifiers are generated by a single control circuit, which establishes their mutual relation. The fundamental drawback of such methods is that one or the other of the driving signals must cross the isolation barrier between the primary and secondary sides and hence the use of an additional transformer is necessary. In addition to this, neither of the two methods takes into account the fact that the current across the secondary diodes (and thus also in the synchronous rectifiers, if appropriately controlled) may be null not only in the final part of each switching half-cycle but also in the initial part.

A final aspect, which is taken marginally into consideration in U.S. Pat. No. 7,184,280, is the advisability of suspending the synchronous rectification when the output current is low and entrusting the secondary rectification function either to the body diodes of the power MOSFETs used as synchronous rectifiers or Schottky diodes connected in anti-parallel with the synchronous rectifiers. In fact, with low currents, the reduction in losses associated with conduction across the turn-on resistance (as compared to the losses across the diode) is cancelled out by the loss of power used to drive the synchronous rectifiers.

Recently, IR has released to the market a device specific for synchronous rectification control in LLC resonant half-bridge converters. It uses a control methodology that enables the synchronous rectifier MOSFETs to be driven without any connection with the driving signals of the primary-side switches. The drain-to-source voltage of each MOSFET is sensed and, when it falls below a threshold the MOSFET is turned on. When the drain-to-source voltage exceeds a predetermined threshold, the MOSFET is turned off. Fixed blanking times, during which the sensing circuit (or its output) is ignored, are provided after turn-on and turn-off to prevent multiple switching. Except that simultaneous conduction of the two MOSFETS is prevented, there is no cross-coupling logic that is concerned with ensuring a symmetrical behavior of the two MOSFETs.

For reasons that will be clear after the detailed description of the methodology proposed in this disclosure, the drawback in this method is a short conduction time that is too short for the synchronous rectifier MOSFETs at medium load, which impairs efficiency in this condition, and the absence of any provision for disabling synchronous rectifier MOSFETs at low load, where synchronous rectification may be detrimental as far as efficiency is concerned.

BRIEF SUMMARY

In view of the state of the art, the present disclosure provides a control device for rectifiers of switching converters that enables the rectifier to be driven in an autonomous manner, i.e., without any direct connection with the controller that provides driving signals of the transistor of the switching converter. In particular, where resonant converters are concerned, this avoids the use of an additional transformer to transfer the driving signals across the primary-secondary side isolation barrier.

According to the present disclosure, this is achieved by means of a control device for a rectifier of a switching converter, the converter supplied by an input voltage and adapted to provide an output current, the rectifier adapted to rectify the current output to the converter and including at least one transistor. The control device is adapted to drive at least one transistor, characterized by comprising a first means or circuit adapted to detect the start and end of each converter switching half-cycle and to measure the duration thereof, second means adapted to generate a signal for turning on the transistor after a given number of measured switching half-cycles of the converter and when the converter output current becomes greater than a reference current.

In view of to the present disclosure it is possible to provide a control device for a rectifier of a switching converter, in particular for a resonant converter, that allows the rectifier to be driven in a manner such as to faithfully reproduce the behavior of the rectifier diodes from the viewpoint of the currents in the transformer. The control device is preferably able to autonomously recognize low load conditions for the converter and, in such a case, suspend driving of the rectifier in order to reduce the associated losses and resume driving as soon as the output current increases.

The control device must therefore increase the conversion efficiency of an LLC-type resonant converter across a range of operating conditions as wide as possible.

BRIEF DESCRIPTION OF THE SEVERAL VIEWS OF THE DRAWINGS

The characteristics and advantages of the present disclosure will become apparent from the following detailed description of an embodiment thereof, illustrated solely by way of non-limitative example in the appended drawings, in which.

DETAILED DESCRIPTION

Figure 1:
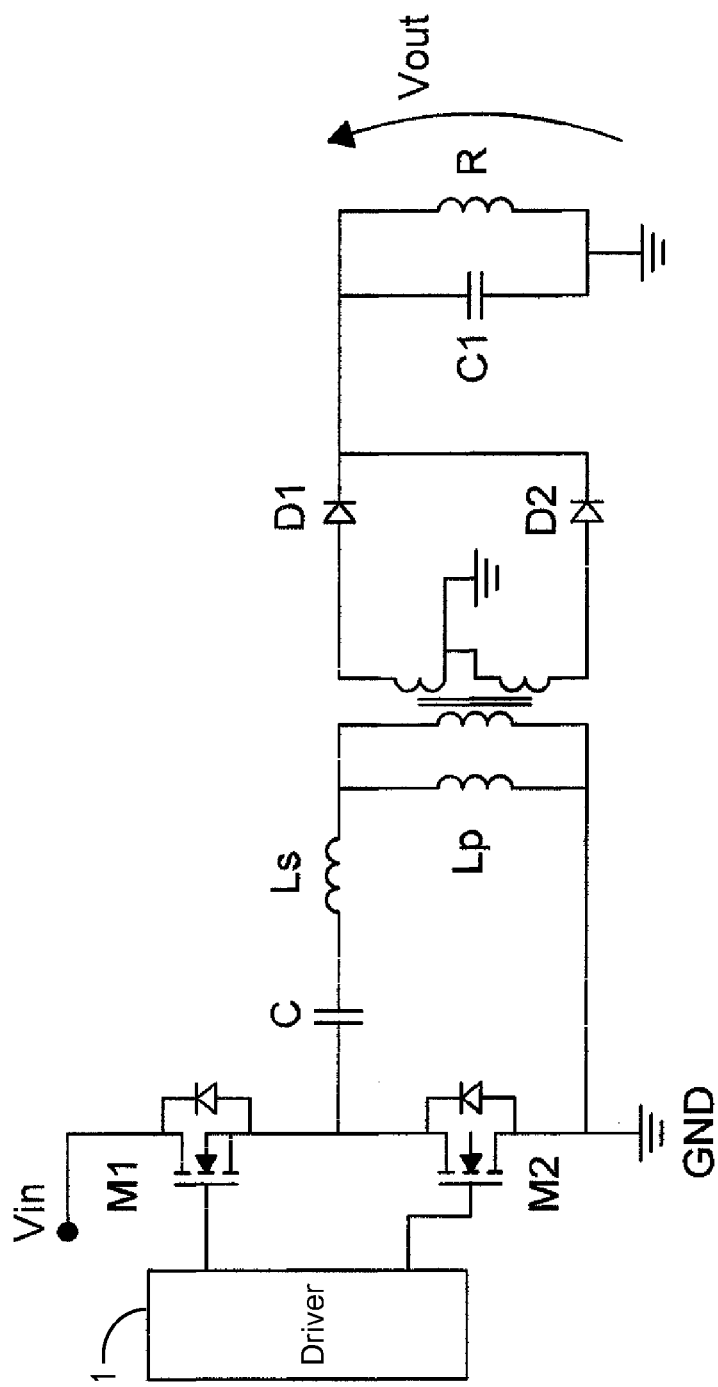
FIG. 1 is a diagram of an LLC-type resonant converter with a center-tapped secondary winding and full-wave rectification by means of diodes according to the known art.
Figure 2:
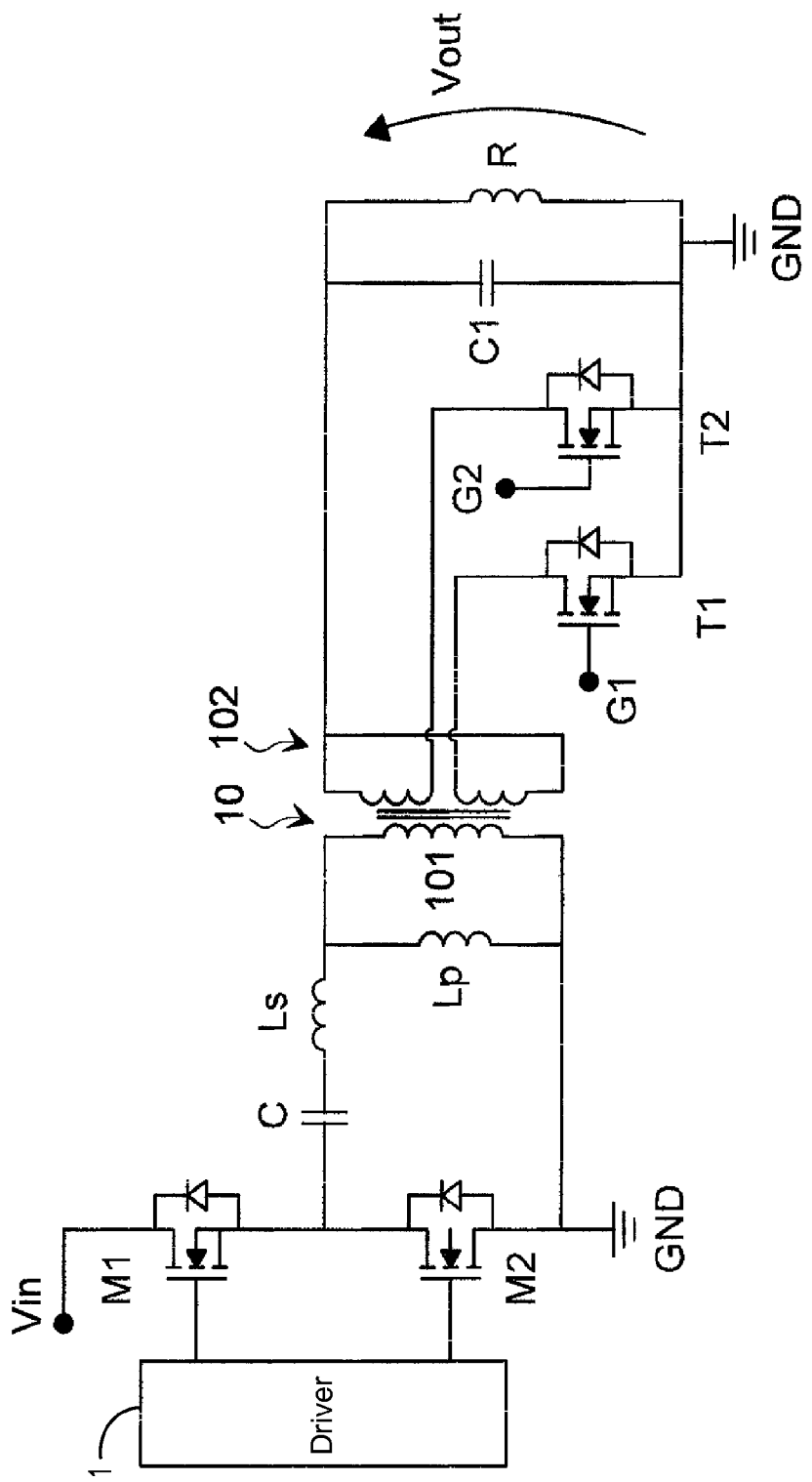
FIG. 2 is a diagram of an LLC-type resonant converter with a center-tapped secondary winding and full-wave rectification by means of synchronous rectifiers according to the known art.
Figure 3:
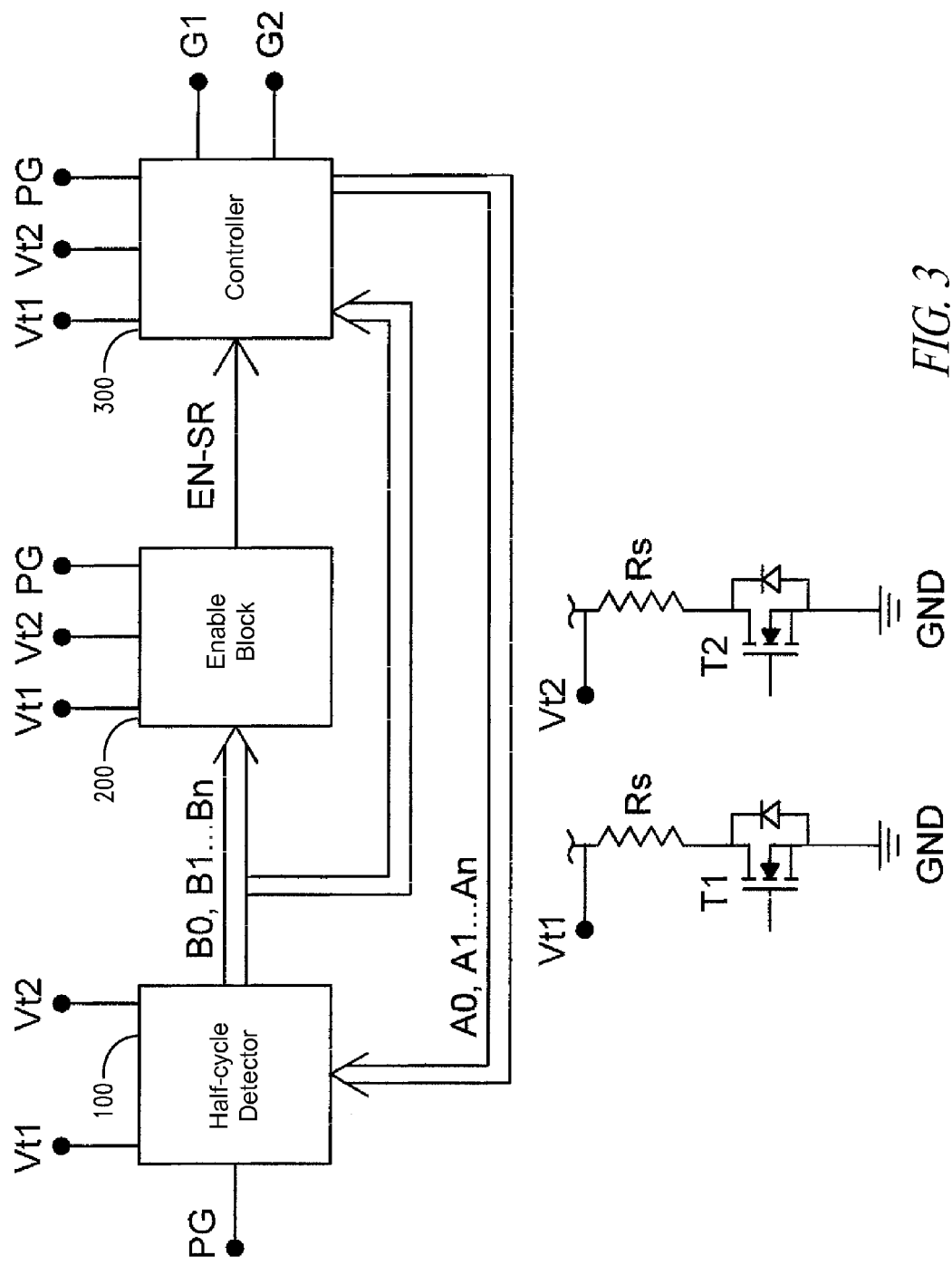
FIG. 3 shows a block diagram of the control device for a rectifier of a switching converter according to the present disclosure.

With reference to FIG. 3, there is shown a control device for rectifiers of a switching converter, in particular rectifiers of resonant converters according to the present disclosure, and more particularly of LLC resonant converters as shown in FIG. 2. The LLC resonant converter is powered by a voltage Vin, preferably a DC voltage, and includes a transformer 10 and an LLC resonant network (consisting of the inductances Ls and Lp and the capacitor C) coupled to the transformer 10, which has a primary winding 101 and a center-tapped secondary winding 102; the transformer provides the output current Iout of the converter. A rectifier having two transistors T1, T2 is coupled to the transformer 10, in particular to the secondary winding 102 of the transformer; more particularly, the transistors T1 and T2 are connected between the terminals of the two parts of the center-tapped secondary winding 102 and ground GND. The converter comprises a control device for the rectifier.

The control device shown in FIG. 3 includes a block 100 capable of detecting the start and end of each converter switching half-cycle and of measuring the length thereof and a block 200 suitable for generating a signal EN-SR for turning on the transistor T1 or T2 after a given number n of measured switching half-cycles of the converter and when the converter output current Iout becomes greater than a reference current Iref. The control device preferably includes a block 300 serving to impose the duration of the turn-on interval of the transistor T1 and of the transistor T2.

The block 100 has as its input parameters the voltages Vt1 and Vt2 across the drain terminals of the power MOSFETs T1, T2 used as synchronous rectifiers in the LLC converter of FIG. 2, and from the block 300 it receives a set of signals A0, A1 . . . An indicative of the operating state of the aforesaid block within each switching half-cycle. Preferably, the block 100 receives as input a logical signal PG indicative of the operational or non-operational state of the resonant converter. The voltages Vt1 and Vt2 can preferably be read using the RDS(on) of T1 and T2 that is the sense resistors Rs connected in series to the drain terminals of the transistors T1 and T2 as shown in FIG. 3.

Figure 4:
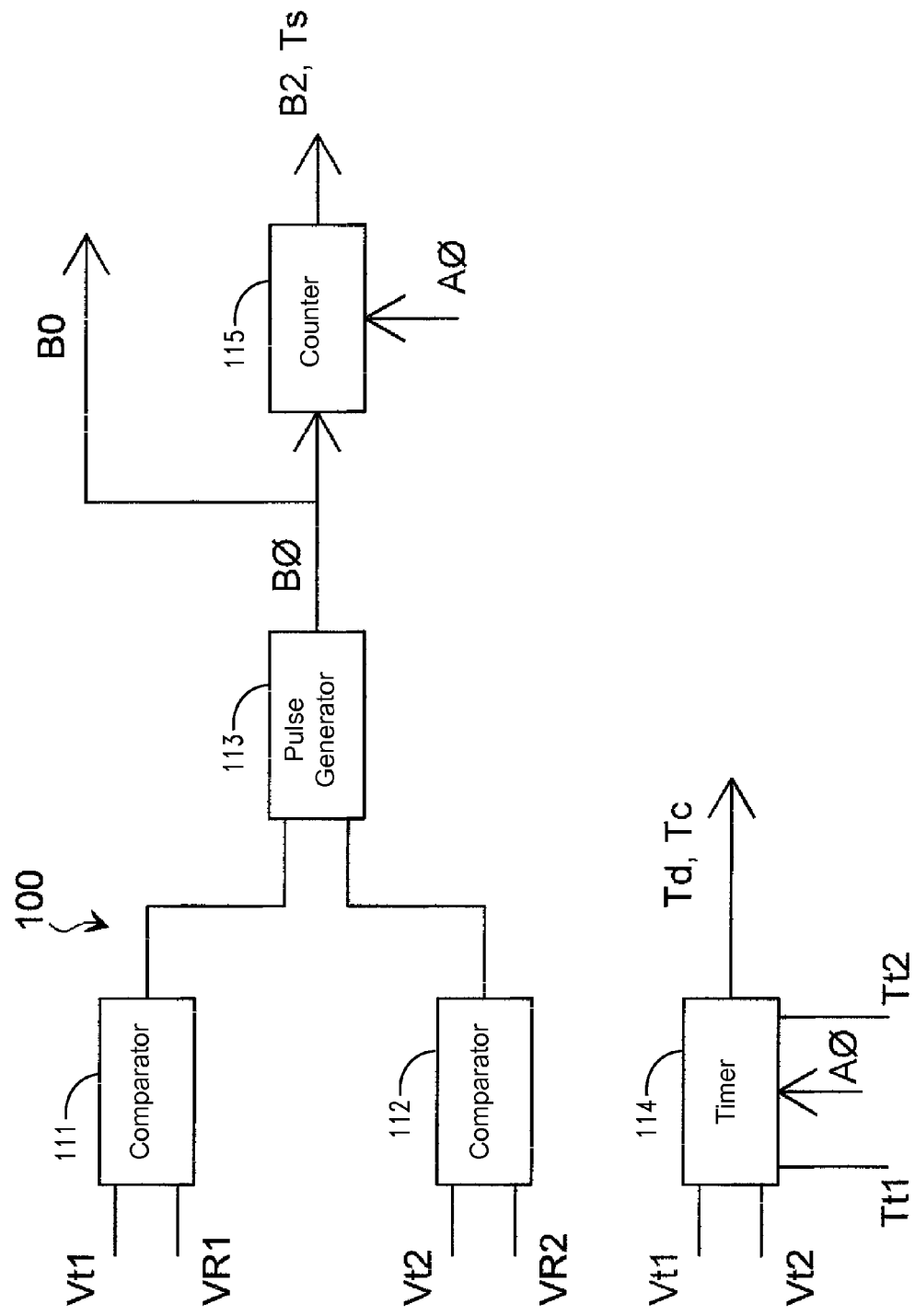
FIG. 4 is a more detailed diagram of the block 100 of the control device of FIG. 3.

The output of the block 100 consists of a set of signals B0, B1 . . . Bn, which may be analogue or digital or both depending on the configuration of the block 100. The start and end of each half-cycle is preferably obtained through means of circuit blocks 111, 112 suitable for comparing the voltages Vt1, Vt2 with the voltage references VR1, VR2, where it is assumed that VR2>VR1, as may be seen in FIG. 4. It is imposed that with Vt1<VR1 and Vt2>VR2 there will be the start of the current half-cycle in which the transistor T1 can be turned on whereas the transistor T2 must remain off and the end of the preceding half-cycle in which T2 may have been turned on while T1 had remained off. It is further imposed that with Vt2<VR1 and Vt1>VR2 there will be the start of the current half-cycle in which the transistor T2 can be turned on and transistor T1 remains off and the end of the preceding half-cycle in which T1 may have been turned on while transistor T2 had remained off. The circuit block 113, which receives the outputs of the comparison circuit blocks 111 and 112, is suitable for generating a pulse signal B0 of finite duration upon the occurrence of one or the other of the aforesaid conditions, indicated as the first and second condition, where the leading edge FS of the pulse B0 is interpreted as the end of the current conduction half-cycle and the trailing edge FD of the pulse B0 is interpreted as the start of the subsequent conduction half-cycle. The duration of each half-cycle, like every other time interval of interest (e.g., duration of the rectifier conduction period or of a certain fraction of the half-cycle), can be measured using any technique of the known art, for example using a high frequency clock synchronized with the pulses B0 or with analogue ramps that are reset on the leading edges FS of the pulses B0 and released on the trailing edges FD of the pulses.

The block 200 has the function of determining, based on the external signals Vt1, Vt2 and the signals B0, B1 . . . Bn originating from the block 100, whether, respectively in the first and second condition described above, the synchronous rectifiers T1 and T2 must be turned on or not. To avoid asymmetries in converter behavior, it is preferable that the logic of the block 200 be such that if the transistor T1 has been turned on upon occurrence of the first condition, the transistor T2 will likewise be turned on upon occurrence of the second condition; whereas if T1 is maintained in the off state, T2 must also be maintained in the off state. This ensures symmetrical behavior of the two synchronous rectifier MOSFETs and counteracts the natural trend of the LLC half-bridge to magnify the effects of any asymmetry in its operation. The output of the block 200 is a logical signal EN-SR which determines whether the transistors T1 and T2 can be turned on in their respective cycles or must be kept in the off state.

Figure 5:
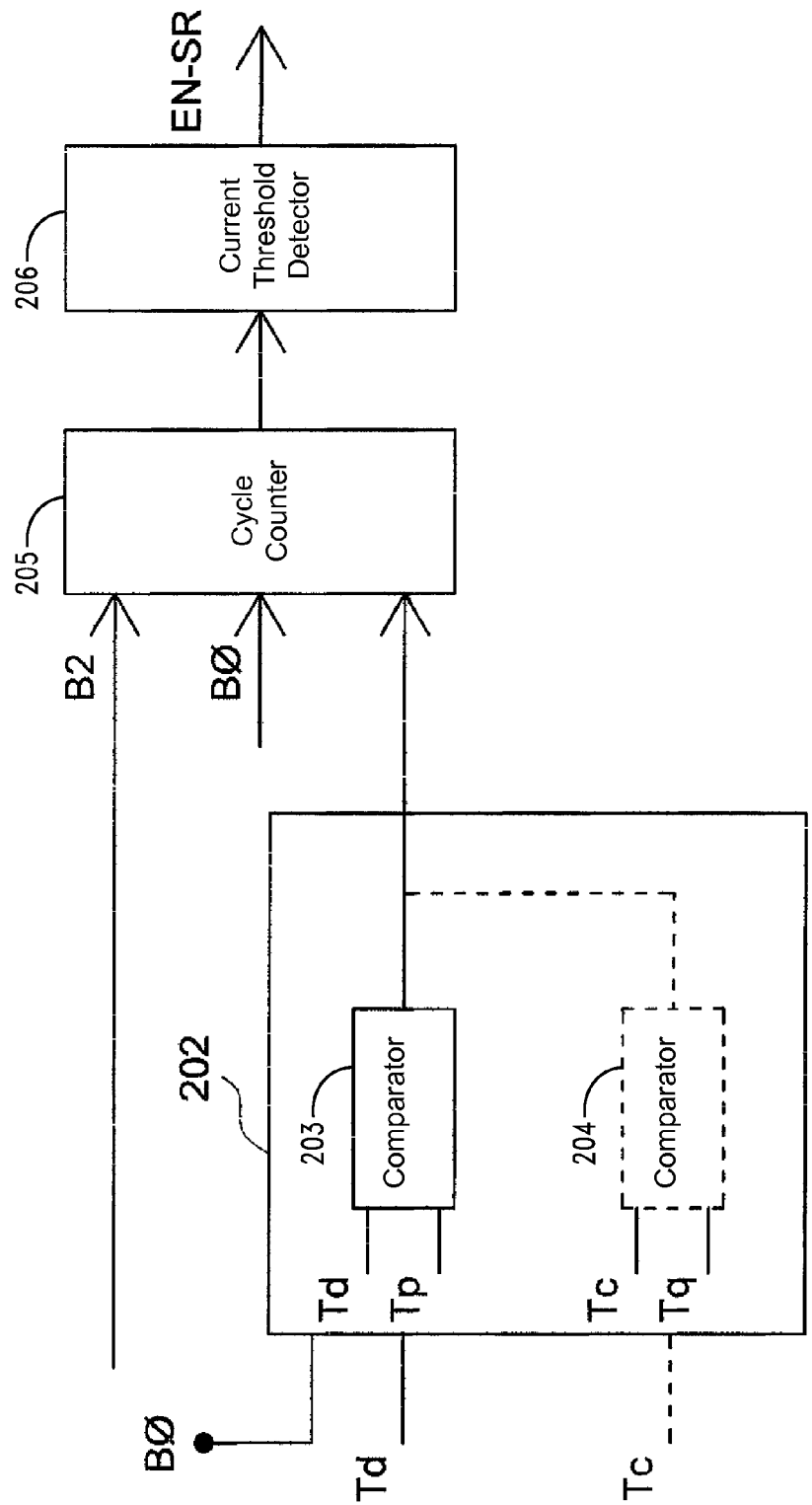
FIG. 5 is a more detailed diagram of the block 200 of the control device of FIG. 3.
Figure 6:
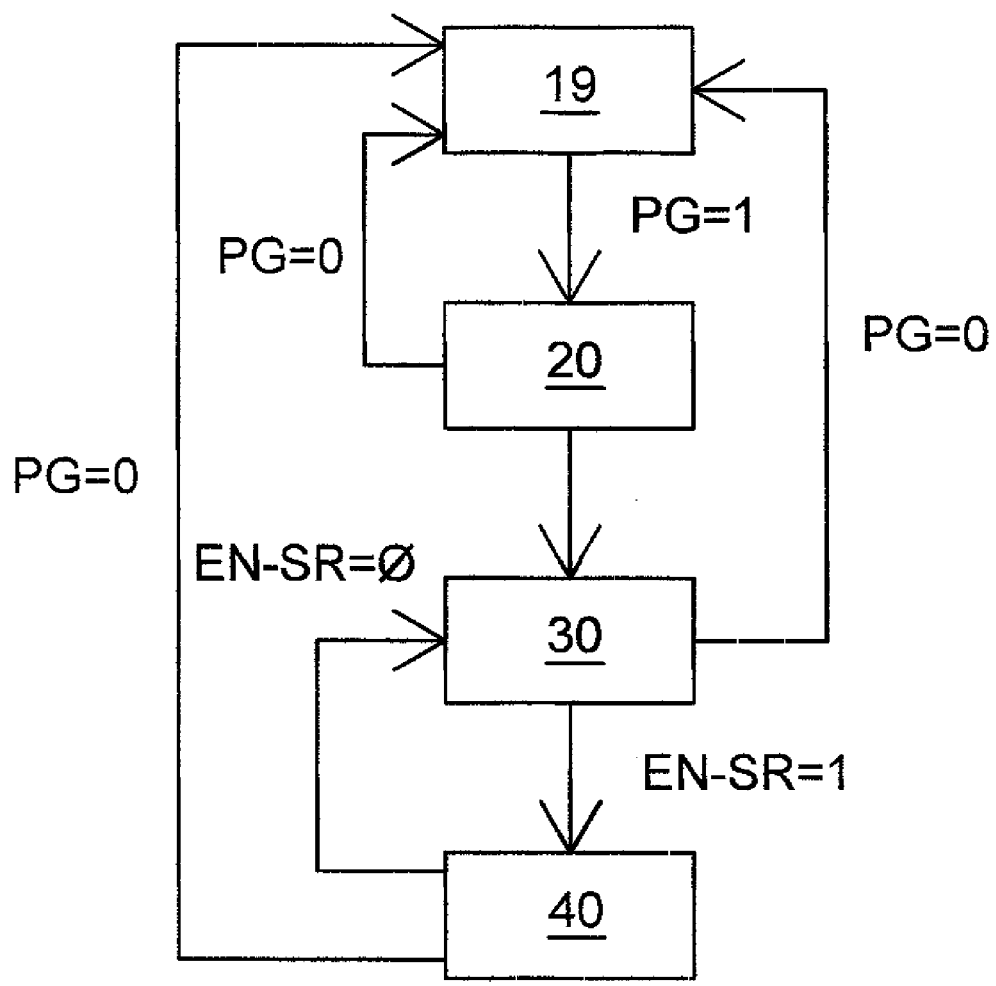
FIG. 6 is a state machine relative to the functioning of the circuit block of FIG. 5.

The operation of the block 200 can be defined by means of a diagram shown in FIG. 5 and the state machine of FIG. 6.

When the signal PG is low, the block 200 will be turned off, either because it is not sufficiently powered or because forcibly disabled from the outside; this state corresponds to state 19 of the state machine of FIG. 6. When the device turns on, i.e., with a high signal PG, because it is correctly powered and/or externally enabled to operate, all of the internal circuits will be turned on, the reference voltages will be generated and will adjust to their steady state value; this state corresponds to state 20 of the state machine of FIG. 6. The block 100, with a high signal PG, will become active, ready to identify the converter switching cycles and to measure the duration of each half-cycle. The block 100 also comprises means 115 (FIG. 4) able to count that a given number n (with n being a positive integer) of converter switching cycles have been identified and measured by the block 100; once the n converter switching cycles have been measured a signal B2 will be transmitted to the block 200, which is in state 30, i.e., the state in which the block 200 is turned on but in non-operational conditions.

The block 200 includes a circuit 202 serving to verify whether the converter output current Iout is greater than a given reference current Iref. In order to verify whether Iout>Iref, a criterion implemented by a circuit 203 or a circuit 204 can be used. The circuit 203 is structured to measure, with reference to the transistor T1, when the interval of time Td, elapsing between the start of a half-cycle and the moment at which the body diode of the transistor T1 begins conducting, becomes shorter than a predetermined time Tt1, which may also be equal to a predetermined fraction a of duration of the switching half-cycle THC. The circuit 204 is instead able to measure, again with reference to the transistor T1, whether the interval of time Tc elapsing between the moment at which the body diode of the transistor T1 begins conducting and the moment at which it ceases conducting exceeds a predetermined time Tt2, which may also be equal to a predetermined fraction α of duration of the switching half-cycle THC. It is possible to operate in the same manner with reference to the transistor T2. The time intervals Td and Tc are provided by the block 100 via the circuit 114 and are among the signals Bo, B1 . . . Bn.

After n switching cycles have been measured and it has been verified that Iout>Iref, the circuit block 200 will emit the logical signal EN-SR via the circuit block 205, i.e., it will bring it to the high logical level; the circuit block 300 will receive the signal EN-SR and enable the turning on of one of the transistors T1 or T2. The state corresponding to the emission of the signal EN-SR is state 40.

In the preferable case where the duration of the switching half-cycle is used as the term of comparison, it is possible to set EN-SR high either at the moment of completion of the measurement of the time interval under observation (Td or Tc), using the duration of the preceding half-cycle as THC, or at the moment of completion of the current half-cycle, in which case the measurement of Td or Tc will be held in memory and the THC value just acquired will be used.

The high-low transition of the signal EN_SR, which occurs when the output current Iout becomes lower than the current Iref, can be determined instead on the basis of criteria which identically mirror those used to determine the low-high transition thereof and with the same circuit 203 or 204: that is to say, either when the interval of time Td elapsing between the start of a half-cycle and the moment at which the body diode T1 begins conducting exceeds a predetermined time or, preferably, a predetermined fraction a of duration of the switching half-cycle THC, or when the interval of time Tc elapsing between the moment at which the body diode TR1 begins conducting (or, alternatively, the moment when T1 is turned on) and the moment at which T1 is turned off becomes shorter than a predetermined time or, preferably, than a predetermined fraction a of duration of the switching half-cycle THC.

It is preferable to wait for a given period of time, i.e., it is preferable that the condition for the transition of the signal EN-SR from high to low or vice-versa does not occur on the basis of the result of the comparison Td or Tc versus a percentage of THC in a single switching cycle, but rather that the result is confirmed for a certain number of switching cycles. This is implemented by circuit 206, which is configured to wait until the condition Iout>Iref is verified for a given number n2 (where n2 is a positive integer) of switching cycles.

It is likewise preferable that the number of switching cycles be different according to whether the transition of the signal EN-SR from low to high or its transition from high to low is considered. The disabling of synchronous rectifiers is something that regards conversion efficiency, and hence the steady state, whereas the enabling thereof also involves aspects regarding the dynamic characteristics of the converter (transient responses to load variations).

Therefore, it is desirable that the transition of the signal EN-SR from high to low occurs when the condition Td>α·THC (or Tc<α·THC is met for n1 consecutive switching cycles while the transition of the signal EN-SR from low to high occurs when the condition Td<α·THC (or Tc>α·THC is met for n2 consecutive switching cycles, with n2<n1. The measurement of the numbers n1 and n2 of switching cycles is obtained via the means 206.

It is possible that the converter may function in an intermittent manner. In such a case, if the half-bridge stops switching, on the secondary side the transition fronts of the voltages Vt1 and Vt2 will cease to be present. It is thus desirable that, if the block 100 does not receive the synchronization signals (and thus there is no longer the generation of pulses B0), the signal EN-SR be forced to low. This may be achieved either by using a "timeout" (for example, when there are no pulses B0 for longer than a predetermined time) or by bringing the signal EN_SR to low at the end of each conduction half-cycle and then bringing it back to high when the synchronism signal B0 is received and Iout>Iref.

The circuit block 300 has the function of controlling, based on the external signals Vt1, Vt2 and PG, the signal EN-SR originating from the block 200 and the signals B0, B1 . . . Bn originating from the circuit 100, how long the synchronous rectifiers T1 and T2 must be turned on. In order to avoid asymmetries in the converter behavior, it is preferable that the logic of the circuit block 300 be such that if the transistor T1 has been turned on upon occurrence of the first condition, the transistor T2 is likewise turned on upon occurrence of the second condition, whereas if T1 is maintained in the off state, T2 must also be maintained in the off state.

Figure 7:
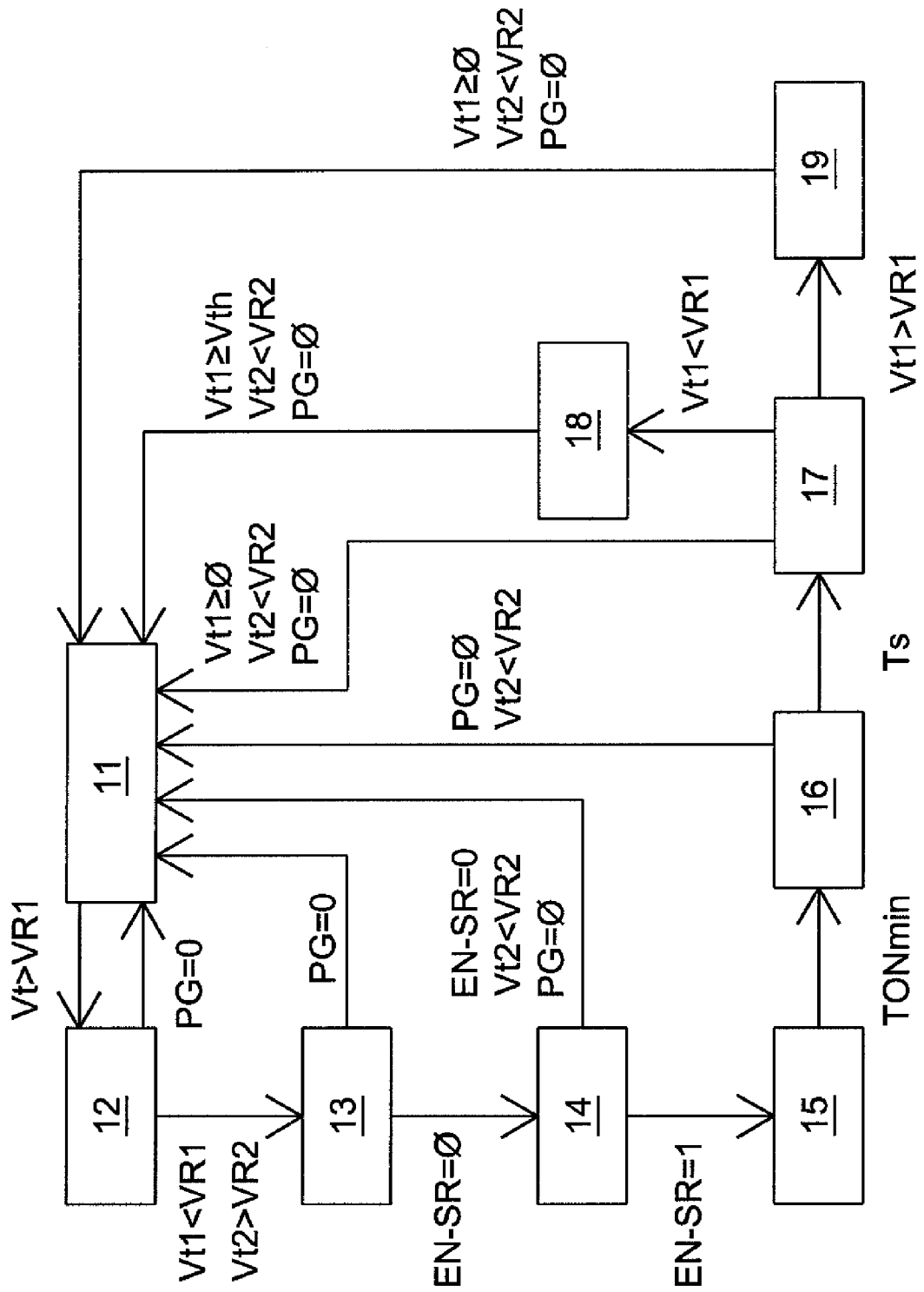
FIG. 7 is a more detailed diagram of the block 300 of the control device of FIG. 3.
Figure 8:
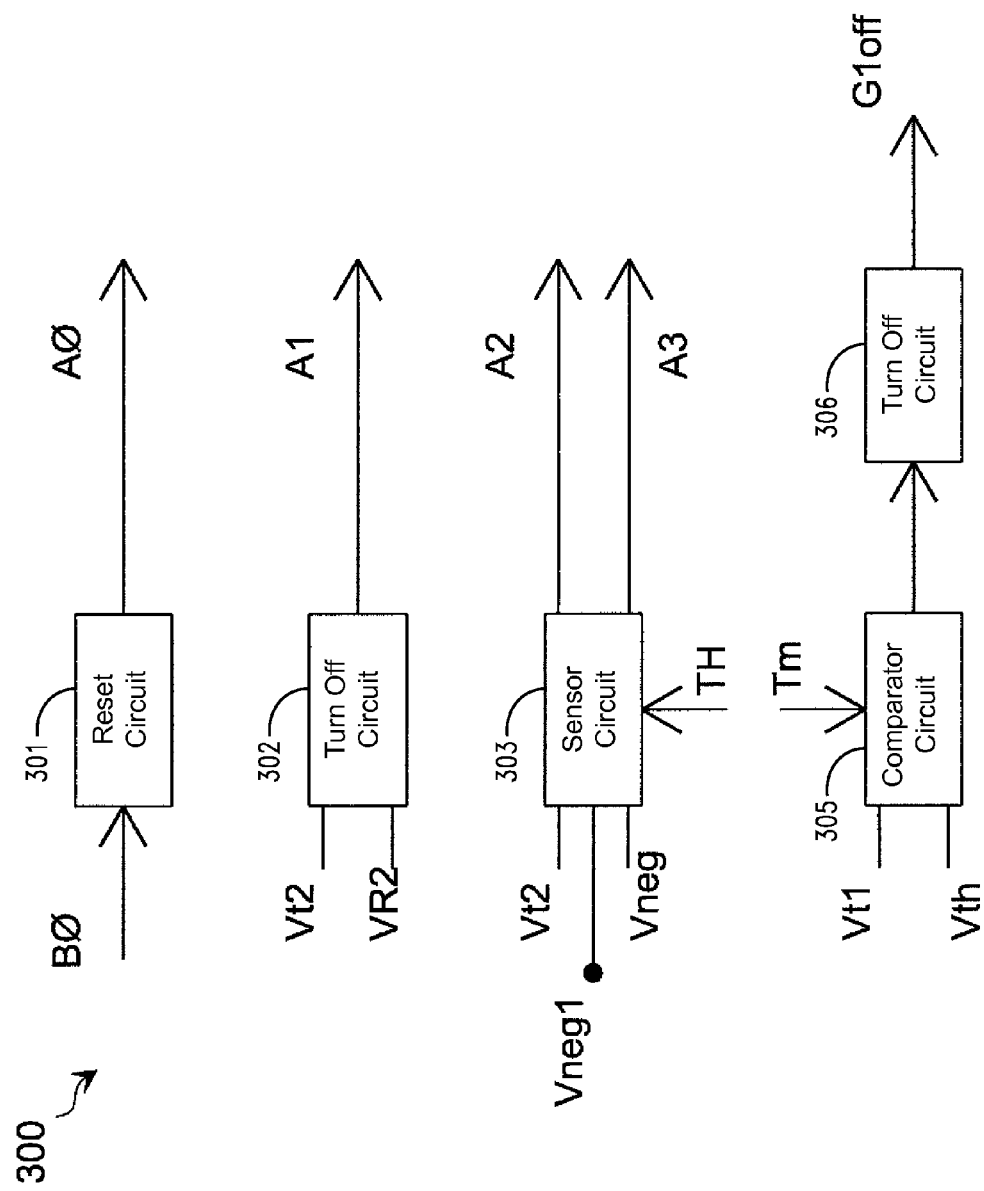
FIG. 8 is a state machine relative to the functioning of the circuit block of FIG. 7.

The operation of the circuit block 300 can be defined by means of a scheme shown in FIG. 7 and a state machine, with reference solely to the transistor T1 in FIG. 8.

When the signal PG is low, the circuit block 300 will be turned off, either because it is not sufficiently powered or because forcibly disabled from the outside; this state corresponds to state 11 of the state machine of FIG. 7.

From state 11 there is a transition to state 12 when it is detected that the voltage Vt1 at the drain of T1 exceeds the reference value VR2, and this state will persist for the entire subsequent switching half-cycle in which T2 may conduct. From state 12 there will be a passage to state 13 on the leading edge of the pulse B0, i.e., when the start of the subsequent half-cycle is identified upon occurrence of the condition Vt1<VR1 and Vt2>VR2. During the time spent in this state, the circuit block 300 will transmit, via circuit 301, a reset pulse A0 to the circuit 100 in order to reset all of the time measuring circuits 114, 115 of the circuit 100 following the acquisition of the duration of the switching half-cycle just determined.

On the trailing edge of the pulse B0 a passage to state 14 occurs.

The circuit block 300 includes circuit 302 suitable for turning off the device with a signal A1, that is, for going back from state 14 to state 11, if it is detected that the voltage Vt2 becomes lower than the reference value VR2. Should this occur, it means that the secondary voltages are reversing for some reason and T2 will turn on as soon as the voltage Vt2 becomes lower than VR1. To avoid the simultaneous conduction of the two synchronous rectifiers, the transistor T1 is not turned on (interlocking logic).

When the signal EN-SR=1 and when it is detected that the body diode associated with the transistor T1 is turned on, a passage to state 15 occurs. The block 300 includes a circuit 303 capable of sensing that the body diode associated with the transistor T1 is turned on; such circuit 303 compares the voltage Vt1 with a negative reference Vneg (e.g., −0.5V) and delivers an output signal A2.

The ceasing of conduction of the body diode of the transistor T1 can be detected in the same way.

In order to be sure that the body diode of the transistor T1 is not turned on due to a spike, it is preferable that the passage to state 15 occurs when the turn-on condition is confirmed for at least a predetermined time period TH; this is ensured by the same means circuit 303. The value of TH represents a compromise between the necessity of masking spikes and that of not overly delaying the turning on of the transistor T1, which would increase the conduction losses and impair efficiency.

The state remains in state 15 for a minimum time TONmin, during which the gate driver G1 will definitely be high and, accordingly, the transistor T1 will definitely be turned on; at the end of this time the passage to state 16 occurs.

From this state it is possible to evolve toward state 11, in the case where the signal PG is low, or where the voltage Vt2 becomes lower than the reference value VR2 (interlocking logic), or where the voltage Vt1 becomes positive or null; the comparison between the voltage Vt2 and the voltage VR2 takes place via the comparison means 112 of the block 100.

The transition from state 16 to state 17 is driven by the block 100 after a predetermined time Ts, which may also be equal to a percentage of the preceding switching half-cycle of the transistor T1 or of the transistor T2. The time Ts is set by the same means 115.

From state 17 the state may evolve toward state 11 if the voltage Vt1 becomes positive or null (reversal of current in the synchronous rectifier) or if Vt2 becomes lower than the reference value VR2 (interlocking logic); or else it may evolve toward a state 18 or a state 19. The decision as to the transition to be effected will be made at the moment the block 100 transmits a signal Tm, originating from the means 115 and corresponding to one half of the duration of the switching half-cycle. At this moment the voltage Vt1 will be compared with a negative reference value Vth close to zero (e.g., −25 mV) via means 305.

If the voltage Vt1<Vth, there will be a transition to state 18, otherwise to state 19. At the halfway point of the switching half-cycle the current across the transistor T1 has not yet reached the peak value and is therefore still on the rise. State 18 will thus be reached when the current across the transistor T1 is of sufficient entity to give rise to a voltage drop greater than |Vth| across its resistance RDSon, that is the resistance between the drain and source terminals when the transistor is turned on, whereas state 19 will be reached when the current across T1 is not of sufficient entity and the voltage across its RDSon is lower than |Vth|. It is assumed that, in the former case, the converter is working in one of the modes associated with a high current regime, where the current derivative is also rather high, and that, in the latter case, it is working in one of the modes associated with a low current regime, where the derivatives, too, are less accentuated.

In the first case (Vt1<Vth), in order to avoid or minimize the current reversal in T1, it is advisable to turn off the latter in advance relative to the moment at which the current actually falls to zero; this is done so as to take into account the inevitable propagation delays of the zero and T1 turn-off sensing circuits. In fact, in this case T1 will be turned off and will pass from state 18 to state 11 when Vt1>Vth.

In the second case (Vt1>Vth), the effect of the propagation delays is more limited, and it is therefore not deemed necessary to turn off T1 in advance; T1 will be turned off as soon as the zero sensing circuits detect that Vt1≧0, an event that marks the passage from state 19 to state 11. The block 300 thus includes a circuit 306 serving to receive the output signal from the circuit 305 and able to turn off the transistor T1 by means of a signal G1 off if the voltage drop across the resistance RDSon of the transistor T1 is greater than |Vth|. The advantage of this differentiation of decisions is that, under intermediate loads, the conduction of transistor T1 will not be ended too early (halfway through the period), losing precisely the part in which the current is greatest. Starting off either from state 18 or state 19, the detection of the condition Vt2<VR2 (interlocking logic) would lead in any case to state 11.

The decision process relative to the control of the synchronous rectifier T2 can be described by a state machine identical to the one considered for the transistor T1, except, possibly, for the fact that during its cycles the signal EN-SR is not updated.

The control device according to the disclosure can be used for any rectifier of a switching converter in which it is necessary to rectify the output current of the converter.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control device for a rectifier of a switching converter, the control device comprising:
   a first circuit configured to detect a start and an end of each of a series of switching semi-cycles of the converter and to measure a duration of each switching semi-cycle; and
   a second circuit coupled to the first circuit and configured to:
      measure the number of switching semi-cycles;
      generate a turning on signal in response to determining that the measured number of switching semi-cycles of the converter reached a threshold number and an output current of the converter is greater than a reference current; and
      turn on a first transistor of the rectifier with the turning on signal.

2. The control device of claim 1, wherein the second circuit includes a drive circuit configured to drive a transistor pair of the rectifier, the transistor pair including the first transistor and to generate the turning on signal.

3. The control device of claim 2, wherein the transistor pair includes a first and a second MOSFET transistor each having a drain terminal, and the first circuit includes a voltage detector configured to detect voltages at respective drain terminals of the transistor pair, and first and second comparators configured to compare the detected voltages with a first and a second reference voltage, with the second reference voltage higher than the first reference voltage, the first circuit configured to generate a pulse signal to the second circuit when a voltage at the drain terminal of the first transistor is lower than the first reference voltage and a voltage at the drain terminal of the second transistor is higher than the second reference voltage or when the voltage at the drain terminal of the second transistor is lower than the first reference voltage while the voltage at the drain terminal of the first transistor is higher than the second reference voltage.

4. The control device according to claim 3, wherein the first circuit includes a measurement circuit configured to measure a duration of the pulse signal.

5. The control device of claim 1, further comprising a third circuit configured to receive the turning on signal from the second circuit and to set a turning on instant and a turning off instant of the first transistor.

6. The control device of claim 5, wherein the third circuit is configured to set the turning on instant of the first transistor when a voltage of the first transistor is lower than a threshold voltage.

7. The control device of claim 5, wherein the third circuit is configured to set the turning on instant of the first transistor after a time delay period.

8. The control device of claim 5, wherein the third circuit includes a further circuit configured to turn off the control device if a voltage of the first transistor is lower than a threshold voltage at a time instant corresponding to half the duration of the switching semi-cycle.

9. The control device of claim 1, wherein the second circuit is configured to determine if the output current of the converter becomes higher than the reference current when a time period between the start of the switching semi-cycles of the converter and an instant when a body diode of the first transistor begins to conduct is lower than a threshold time period.

10. The control device of claim 1, wherein the second circuit is configured to determine if the output current of the converter becomes higher than the reference current when a time period between an instant when a body diode of the at least one transistor begins to conduct and a time instant when the body diode stops conducting is higher than a threshold time period.

11. The control device of claim 1, wherein the second circuit includes a switch circuit configured to turn off the first transistor when the output current of the converter becomes lower than the reference current.

12. The control device of claim 1, wherein the second circuit is configured to generate the turning on signal when the output current of the converter is higher than the reference current for a threshold number of measured switching semi-cycles of the converter.

13. A switching resonant converter, comprising:
a transformer configured to provide an output current of the converter, the transformer including:
a primary winding and a secondary winding, the secondary winding having a center tap;
a resonant network coupled to the primary winding of the transformer; and
a rectifier coupled to the secondary winding and configured to rectify the output current of the converter, the rectifier having a rectification transistor pair; and
a control device configured to control the rectifier, the control device having:
a first circuit configured to detect a start and an end of a series of switching semi-cycles of the converter and configured to measure a number of switching semi-cycles and to measure a duration of each switching semi-cycle; and
a second circuit coupled to the first circuit and configured to generate a turning on signal configured to turn on a first transistor of the rectification transistor pair in response to determining that the measured number of switching semi-cycles of the converter has reached a threshold number and an output current of the converter is greater than a reference current.

14. The switching resonant converter of claim 13, wherein the control device second circuit has a drive circuit configured to drive the transistor pair and to generate the turning on signal.

15. The switching resonant converter of claim 13, further comprising a third circuit configured to receive the turning on signal from the second circuit and configured to set a time period between a turning on instant and a turning off instant of the at least one transistor.

16. The switching resonant converter of claim 15, wherein the third circuit is configured to determine the turning on instant of the first transistor when a voltage on a terminal of the first transistor is lower than a threshold voltage.

17. The switching resonant converter of claim 16, wherein the third circuit includes a further circuit configured to turn off the control device if a voltage on the first transistor is lower than a threshold voltage at a time instant corresponding to half the duration of a switching semi-cycle.

18. The switching resonant converter of claim 15, wherein the third circuit is configured to determine the turning on instant of the first transistor after a time delay period.

19. A method of controlling a rectifier of a switching converter, the method comprising:
detecting a start and an end of each switching semi-cycle of the converter;
measuring the number of switching semi-cycles;
measuring a duration of each switching semi-cycle; and
generating a signal configured to turn on a transistor of the rectifier in response to determining that the measured number of switching semi-cycles of the converter has reached a threshold number and an output current of the converter is greater than a reference current.

20. The method of claim 19, comprising:
determining a turning on instant of the at least one transistor when a voltage on a terminal of the at least one transistor is lower than a given voltage.

21. The method of claim 19, further including turning off the at least one transistor when the output current of the converter becomes lower than the reference current, and turning on the at least one transistor when the output current of the converter is higher than the reference current for a given number of measured switching semi-cycles of the converter.

22. The method of claim 19, wherein generating a signal comprises generating a signal configured to turn on first and second transistors, the method further including:
detecting voltages on a respective terminal of the first and second transistors;
comparing the detected voltages with a first and a second reference voltage in which the second reference voltage is higher than the first reference voltage; and
generating a pulse signal when the detected voltage at the first transistor is lower than the first reference voltage and the detected voltage at the terminal of the second transistor is higher than the second reference voltage, or, when the detected voltage at the terminal of the second transistor is lower than the first reference voltage while the detected voltage at the terminal of the first transistor is higher than the second reference voltage.

23. A control device for a rectifier of a switching converter, the converter supplied with an input voltage and configured to provide an output current, the rectifier configured to rectify the output current of the converter and having at least one transistor that includes terminals, the control device comprising:
a first circuit configured to detect a start and an end of each switching semi-cycle of the converter and to measure the duration thereof;
a second circuit configured to generate a turning on signal that is configured to enable turning on of the at least one transistor after a given number of measured switching semi-cycles of the converter and when the output current of the converter is greater than a reference current; and a third circuit configured to receive the turning on signal from the second circuit and to set a turning on instant and a turning off instant of the at least one transistor, the third circuit including a further circuit configured to turn off the control device if the voltage detected between the terminals of the turned on transistor is lower than a further given voltage at a time instant corresponding to half the duration of the switching semi-cycle.

24. The control device of claim 23, wherein the third circuit is configured to determine the turning on instant of the at least one transistor when a voltage on a terminal of the at least one transistor is lower than a given voltage.

25. The control device of claim 23, wherein the third circuit is configured to determine the turning on instant of the at least one transistor after a time delay period.

26. The control device of claim 23, wherein the second circuit includes a switch circuit configured to turn off the at least one transistor when the output current of the converter becomes lower than the reference current.

27. A control device for a rectifier of a resonant switching converter, the converter supplied with an input voltage and configured to provide an output current, the rectifier configured to rectify the output current of the converter, the rectifier having at least one single rectification transistor pair that includes a first and a second MOSFET transistor that are provided with drain terminals and a body diode, the control device further including a transformer with a primary winding and secondary winding and a resonant network coupled to the primary winding of the transformer and configured to receive the input voltage, the secondary winding being of the center tap type and coupled with the rectifier, the control device comprising:

a first circuit configured to detect a start and an end of a switching semi-cycle of the converter and to measure a duration thereof, the first circuit including a voltage detector configured to detect voltages at the drain terminals of the transistor pair and first and second comparators configured to compare the detected voltages with a first and a second reference voltage, with the second voltage higher than the first voltage, the first circuit configured to send a pulse signal when the detected voltage at the drain terminal of the first transistor is lower than the first reference voltage while the detected voltage at the drain terminal of the second transistor is higher than the second reference voltage or when the detected voltage at the drain terminal of the second transistor is lower than the first reference voltage while the detected voltage at the drain terminal of the first transistor is higher than the second reference voltage; and a second circuit configured to receive the pulse signal, the second circuit having a drive circuit configured to drive the transistor pair and to generate a turning on signal configured to turn on the at least one transistor of the transistor pair after a given number of measured switching semi-cycles of the converter and when the output current of the converter is greater than a reference current.

28. The control device according to claim 27, wherein the first circuit includes a measurement circuit configured to measure a duration of the pulse signal.

29. A switching resonant converter having an input voltage, the converter comprising:

a transformer configured to provide output current of the converter, the transformer including a primary and secondary winding and a resonant network coupled to the primary winding of the transformer and the input voltage;

a rectifier coupled to the secondary winding and configured to rectify the output current of the converter, the secondary winding comprising a center tap type and the rectifier comprising at least one single rectification transistor pair;

a control device of the rectifier, the control device including:

a first circuit configured to detect a start and an end of a switching semi-cycle of the converter and configured to measure the duration thereof; and a second circuit configured to generate a turning on signal for the turning on of at least one transistor of the rectification transistor pair after a given number of measured switching semi-cycles of the converter and when the output current of the converter is greater than a reference current; and a third circuit configured to receive the turning on signal at the output of the second circuit and configured to set a time period between a turning on instant and a turning off instant of the at least one transistor, the third circuit including a further circuit configured to turn off the control device if a voltage detected between terminals of the turned on at least one transistor is lower than a given voltage at the time instant corresponding to half the duration of the switching semi-cycle.

30. The control device of claim 29, wherein the second circuit includes a drive circuit configured to drive the transistor pair and to generate the turning on signal.

31. The control device of claim 29, wherein the third circuit is configured to determine the turning on instant of the at least one transistor after a time delay period.

* * * * *